United States Patent
Tagle (10) Patent No.: US 11,732,849 B1
(45) Date of Patent: Aug. 22, 2023

(54) EMERGENCY LIGHTING ASSEMBLY (71) Applicant: Roel Tagle, San Antonio, TX (US)

(72) Inventor: Roel Tagle, San Antonio, TX (US)

( * ) Notice: Subject to any disclaimer, the term of this patent is extended or adjusted under 35 U.S.C. 154(b) by 0 days.

(21) Appl. No.: 17/984,836

(22) Filed: Nov. 10, 2022

(51) Int. Cl.
| | |
|---|---|
| F21S 4/26 | (2016.01) |
| F21V 27/00 | (2006.01) |
| F21V 21/40 | (2006.01) |
| G08B 5/36 | (2006.01) |
| H02G 11/02 | (2006.01) |
| F21V 21/088 | (2006.01) |

(52) U.S. Cl.
CPC ............ F21S 4/26 (2016.01); F21V 21/0885 (2013.01); F21V 21/406 (2013.01); F21V 27/00 (2013.01); G08B 5/36 (2013.01); H02G 11/02 (2013.01)

(58) Field of Classification Search
CPC ........ F21V 27/00; F21V 27/005; F21V 27/02; F21S 4/22; F21S 4/24; F21S 4/26
See application file for complete search history.

(56) References Cited

U.S. PATENT DOCUMENTS

| | | | |
|---|---|---|---|
| D604,244 S | 11/2009 | Kovacik | |
| D624,020 S | 9/2010 | Kovacik | |
| 9,841,152 B2 | 12/2017 | Stafford | |
| 10,026,277 B2 | 7/2018 | Huo | |
| 10,173,583 B2 | 1/2019 | Moinicken | |
| 11,109,933 B2* | 9/2021 | Seely-Morgan | ....... A61B 50/24 |
| 2004/0012979 A1 | 1/2004 | Squicciarini | |
| 2005/0152142 A1 | 7/2005 | Traynor | |
| 2015/0251598 A1 | 9/2015 | Andrews | |
| 2015/0300581 A1* | 10/2015 | Huang | ..................... F21L 4/00 |
| | | | 362/86 |
| 2019/0143889 A1* | 5/2019 | Kelly | ..................... B65H 75/40 |
| | | | 340/903 |

FOREIGN PATENT DOCUMENTS

| | | | | |
|---|---|---|---|---|
| WO | WO2021058119 | | 4/2021 | |
| WO | WO-2021058119 A1 * | | 4/2021 | ............. B65H 75/40 |

* cited by examiner

Primary Examiner — Sean P Gramling (57) ABSTRACT

An emergency lighting assembly includes a drum that has a chute extending into the drum. A spool is rotatably disposed within the drum. The spool is biased to rotate in a first direction and the spool is urgeable to rotate in a second direction. A locking mechanism is movably integrated into the drum to inhibit the spool from rotating and to facilitate the spool to rotate. A light rope is attached to the spool and the light rope can be pulled outwardly through the chute thereby facilitating the light rope to be positioned on the roadway. The light rope is illuminated when the light rope is turned on to visually alert motorists on the roadway to the hazard on the roadway. A clasp is attached to the light rope and the clasp is attachable to a support object for retaining the light rope in a desired position on the roadway.

8 Claims, 6 Drawing Sheets

EMERGENCY LIGHTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lighting devices and more particularly pertains to a new lighting device for directing motorists around a hazard on a roadway. The device includes a drum and a spool rotatably disposed in the drum. The device includes a light rope wrapped around the spool which can be pulled outwardly from the drum. The light rope can be laid on a roadway to cordon off a hazard on the roadway. The device includes a control panel for controlling a color of light emitted by the light rope as well as to select a sequence of blinking of the light rope. In this way the light rope can direct traffic on the roadway around the hazard.

(2) DESCRIPTION OF RELATED ART INCLUDING INFORMATION DISCLOSED UNDER 37 CFR 1.97 AND 1.98

The prior art relates to lighting devices including a traffic control device that includes a support strip wrapped around a spool and plurality of light emitting units attached to the support strip. The prior art discloses a linear illuminator device that includes a spool, a rope wrapped around the spool and a linear light emitter being integrated into the rope. The prior art discloses an emergency lighting system that includes a portable strip that has a recess integrated into a top side of the portable strip and a plurality of light emitters disposed in the recess. The prior art discloses a light transmitting cable that includes a plurality of light emitters that are each attached to an outer surface of the light transmitting cable. The prior art discloses a vehicle hazard light system which includes a band, a plurality of light emitters attached to the band and a cigarette lighter adapter for powering the light emitters.

BRIEF SUMMARY OF THE INVENTION

An embodiment of the disclosure meets the needs presented above by generally comprising a drum that has a chute extending into an interior of the drum. A spool is rotatably disposed within the drum. The spool is biased to rotate in a first direction and the spool is urgeable to rotate in a second direction. A locking mechanism is movably integrated into the drum to inhibit the spool from rotating and to facilitate the spool to rotate. A light rope is attached to the spool and the light rope can be pulled outwardly through the chute thereby facilitating the light rope to be positioned on the roadway. The light rope is illuminated when the light rope is turned on to visually alert motorists on the roadway to the hazard on the roadway. A clasp is attached to the light rope and the clasp is attachable to a support object for retaining the light rope in a desired position on the roadway.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
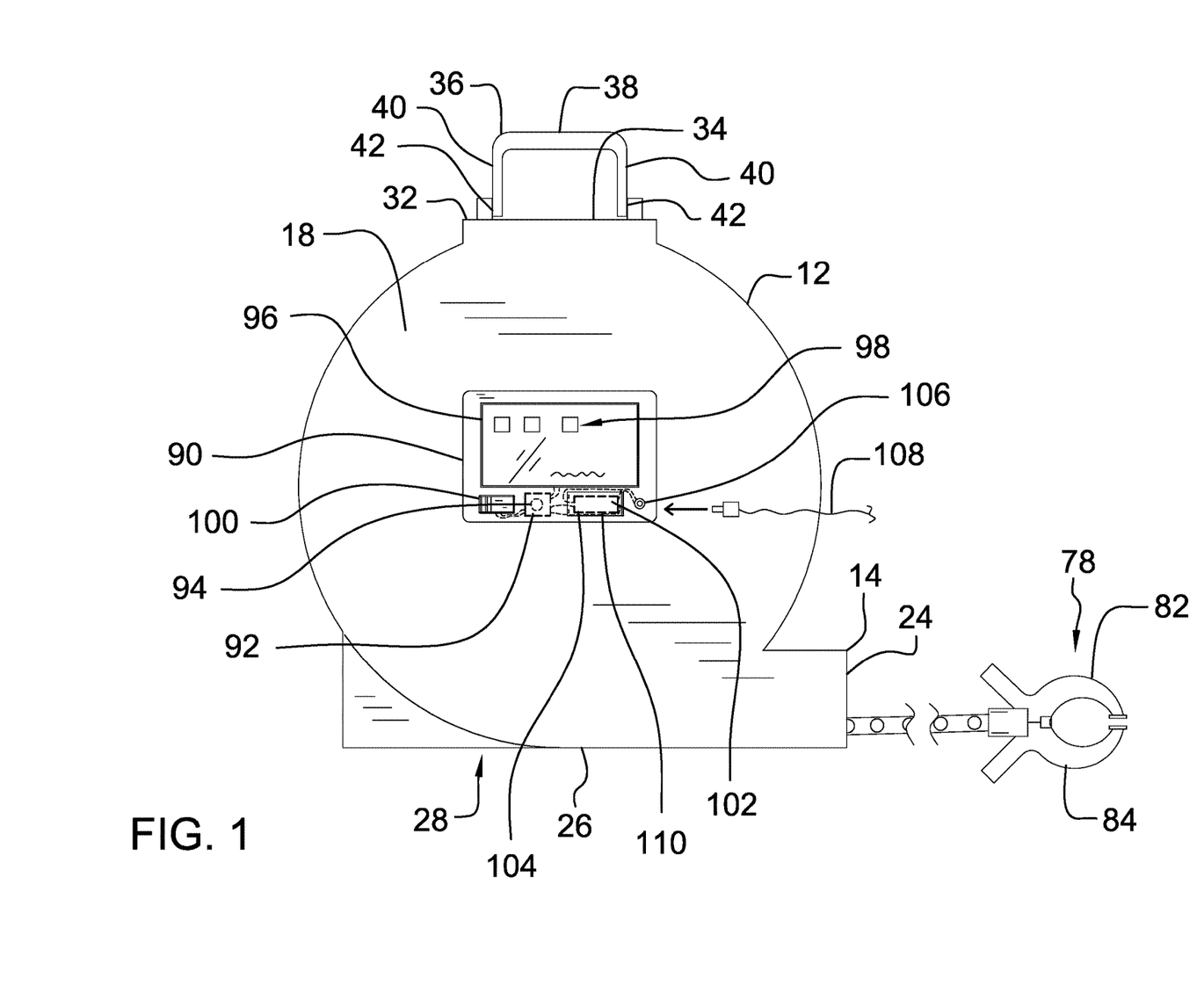
FIG. 1 is a right side view of an emergency lighting assembly according to an embodiment of the disclosure.
Figure 2:
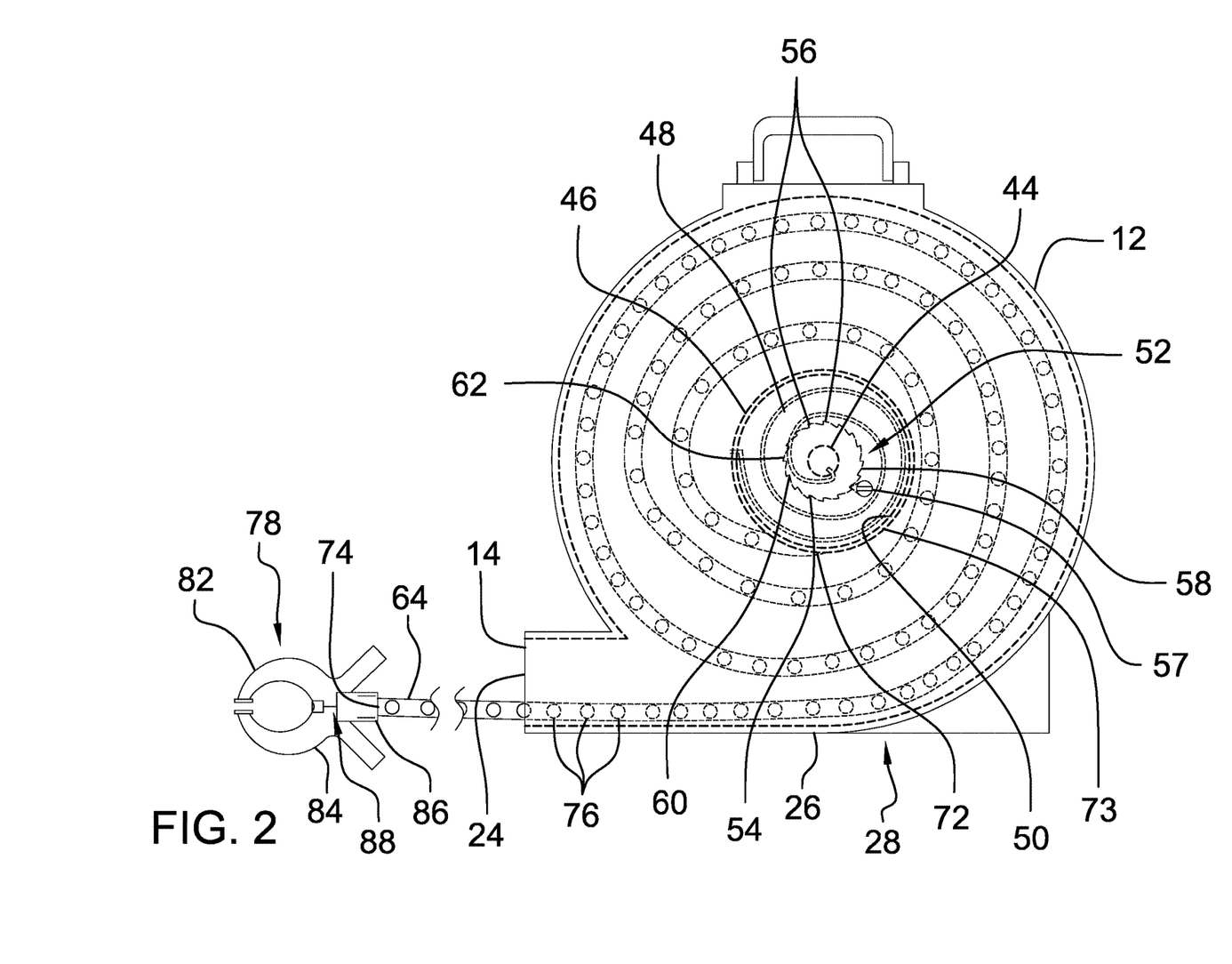
FIG. 2 is a left side phantom view of an embodiment of the disclosure.
Figure 3:
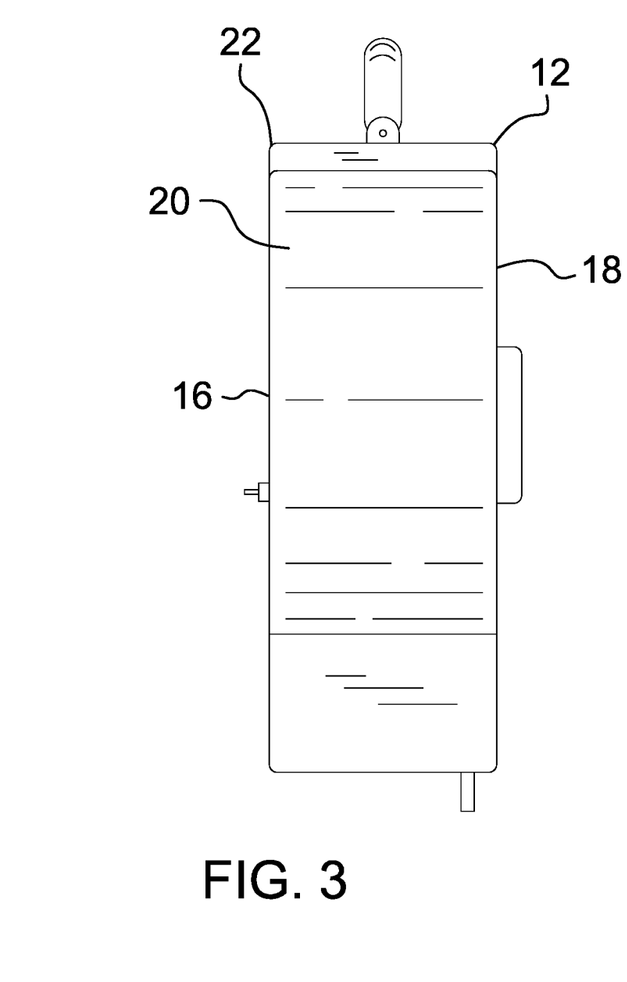
FIG. 3 is a back view of an embodiment of the disclosure.
Figure 4:
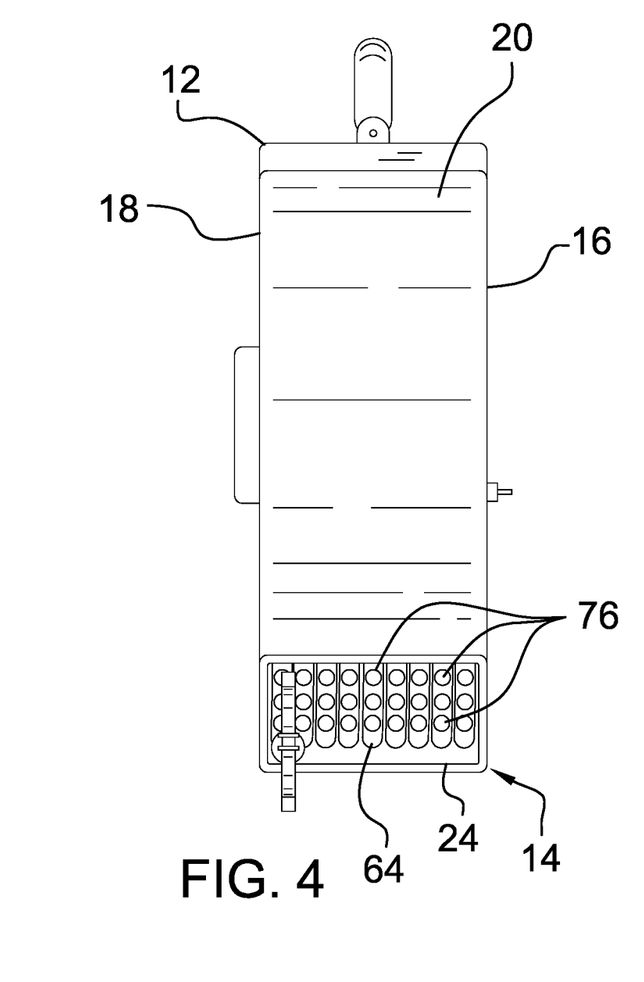
FIG. 4 is a front view of an embodiment of the disclosure.
Figure 5:
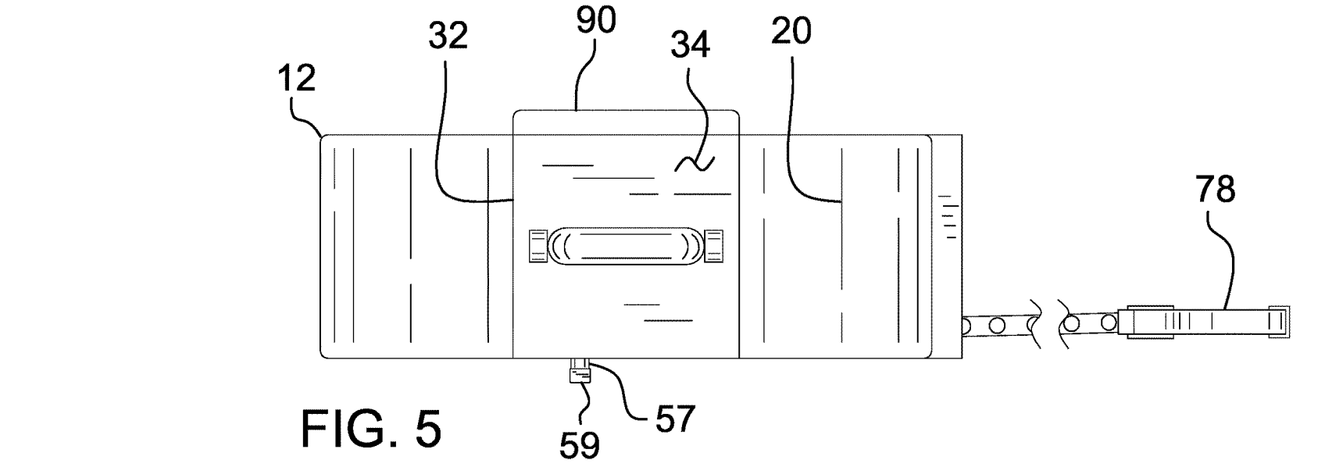
FIG. 5 is a top view of an embodiment of the disclosure.
Figure 6:
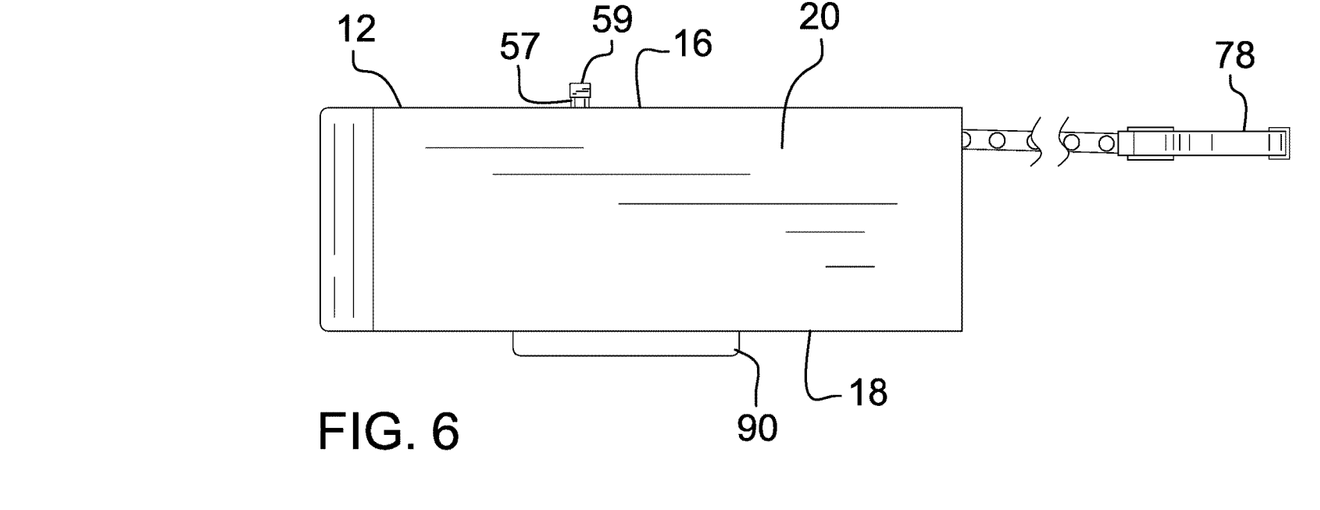
FIG. 6 is a bottom view of an embodiment of the disclosure.
Figure 7:
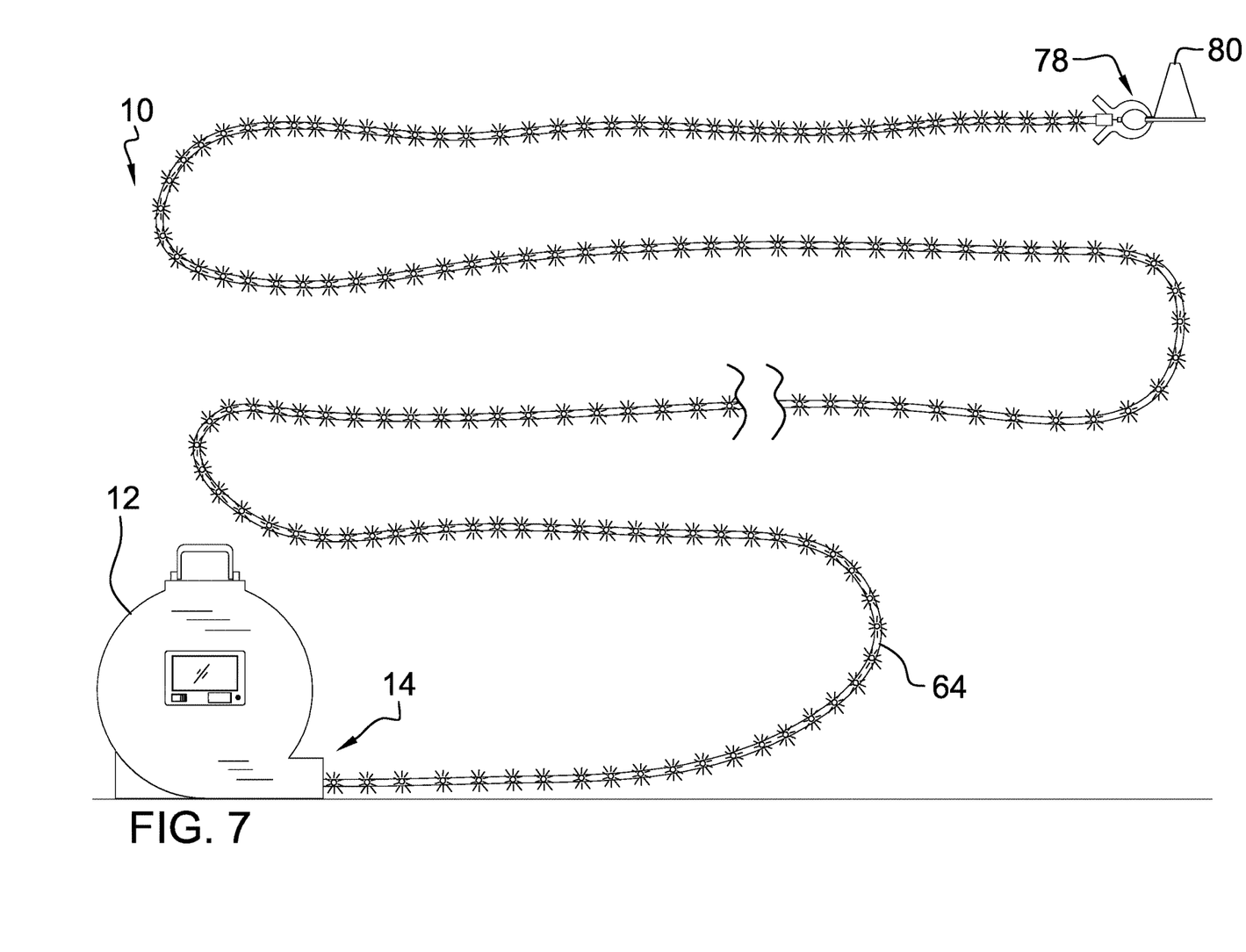
FIG. 7 is a perspective view of an embodiment of the disclosure showing a light rope being drawn out of a drum.
Figure 8:
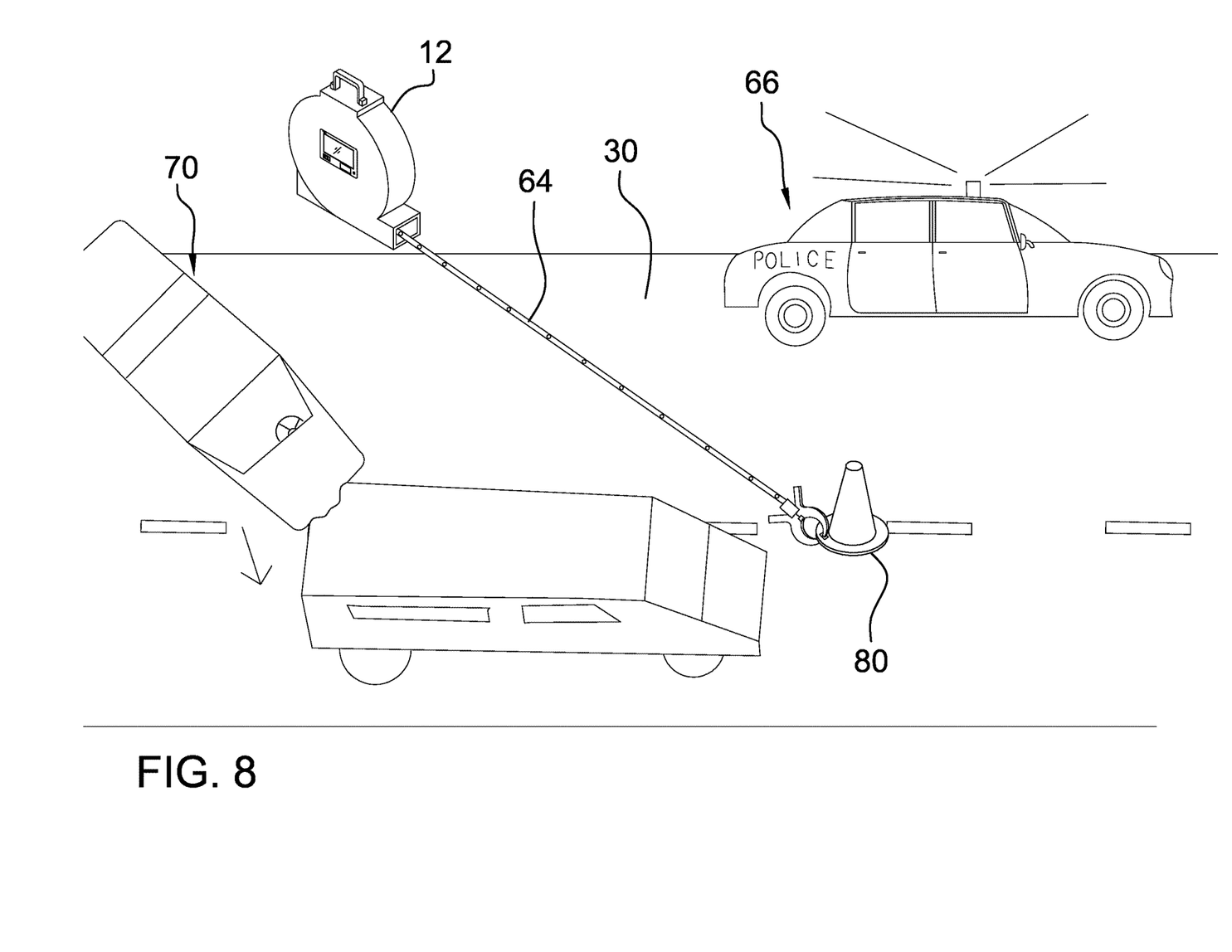
FIG. 8 is a perspective in-use view of an embodiment of the disclosure.

With reference now to the drawings, and in particular to FIGS. 1 through 8 thereof, a new lighting device embodying the principles and concepts of an embodiment of the disclosure and generally designated by the reference numeral 10 will be described.

As best illustrated in FIGS. 1 through 8, the emergency lighting assembly 10 generally comprises a drum 12 that has a chute 14 extending into an interior of the drum 12. The drum 12 has a first lateral wall 16, a second lateral wall 18 and an outer wall 20 extending between the first lateral wall 16 and the second lateral wall 18. Each of the first lateral wall 16 and the second lateral wall 18 has a perimeter edge 22 that is continuously arcuate about a center of the drum 12 such that each of the first lateral wall 16 and the second lateral wall 18 has a circular shape. The chute 14 extends away from the outer wall 20, the chute 14 has a distal end 24 with respect to the outer wall 20 and a lower surface 26 and the distal end 24 is open. Furthermore, the lower surface 26 defines a base 28 of the drum 12 thereby facilitating the base 28 to be positioned on a roadway 30 having drum 12 extending upwardly from the roadway 30. The roadway 30 may be a state highway, an interstate highway or any other public roadway 30 upon which motorized vehicles travel.

The outer wall 20 has a prominence 32 extending away from the outer wall 20 and the prominence 32 is positioned on an opposite side of the outer wall 20 with respect to the chute 14. The prominence 32 has a top surface 34 which lies on a plane that is oriented parallel with the lower surface 26 of the chute 14. A handle 36 is pivotally attached to the drum 12 thereby facilitating the handle 36 to be gripped for carrying the drum 12. The handle 36 has a central member 38 extending between a pair of outward members 40. A lower end 42 of each of the outward members 40 is pivotally attached to the top surface 34 of the prominence 32 thereby facilitating the central member 38 to be gripped.

An axle 44 extends between the first lateral wall 16 and the second lateral wall 18 of the drum 12 and the axle 44 is centrally positioned in the drum 12. A spool 46 is rotatably disposed within the drum 12. The spool 46 is biased to rotate in a first direction, the spool 46 is urgeable to rotate in a second direction and the spool 46 is rotatably disposed on the axle 44. The spool 46 includes a biasing member 48 that is coiled around the axle 44 and the biasing member 48 is attached to the axle 44 and an interior surface 50 of the spool 46. Furthermore, the biasing member 48 biases the spool 46 to rotate in the first direction around the axle 44.

A locking mechanism 52 is movably integrated into the drum 12 and the locking mechanism 52 releasably engages the spool 46. The locking mechanism 52 is biased into a locking condition to inhibit the spool 46 from rotating and the locking mechanism 52 is urgeable into an unlocking condition to facilitate the spool 46 to rotate. The locking mechanism 52 comprises a gear 54 that is rotatably disposed around the axle 44 and the gear 54 is attached to the spool 46. The gear 54 has a plurality of teeth 56 distributed around an outer surface 58 of the gear 54. Each of the teeth 56 has a first surface 60 that is perpendicularly oriented with the outer surface 58 of the gear 54. Additionally, each of the teeth 56 has a second surface 62 which slopes between the first surface 60 and the outer surface 58 of the gear 54. The first surface 60 of each of the teeth 56 faces the direction of rotation associated with the first direction of the spool 46 and the second surface 62 of each of the teeth 56 faces the direction of rotation associated with the second direction of the spool 46.

A peg 57 is included and the peg 57 extends through the first lateral wall 16 of the drum 12. The peg 57 has a knob 59 that is attached to the peg 57 which is positioned outside of the drum 12 thereby facilitating the peg 57 to be gripped. The peg 57 is aligned with the outer surface 58 of the gear 54 and the peg 57 is biased to extend laterally across the outer surface 58 of the gear 54. The second surface 62 of each of the teeth 56 slides along the peg 57 when the spool 46 is rotated in the second direction. The first surface 60 of a respective one of the teeth 56 abuts the peg 57 when the spool 46 is biased to rotate in the first direction thereby inhibiting the spool 46 from rotating in the first direction. The peg 57 is urgeable outwardly through the first lateral wall 16 of the drum 12 having the peg 57 being displaced from the outer surface 58 of the gear 54 thereby facilitating the spool 46 to rotate in the first direction.

A light rope 64 is attached to the spool 46 and the light rope 64 is wrapped around the spool 46 when the spool 46 rotates in the first direction such that the light rope 64 is stored within the drum 12. The spool 46 is urged to rotate in the second direction when the light rope 64 is pulled outwardly through the chute 14 thereby facilitating the light rope 64 to be positioned on the roadway 30. In this way the light rope 64 can be positioned in front of a hazard 66 on the roadway 30. The hazard 66 may be a vehicular accident, a traffic stop or other type of hazard that typically involves the presence of law enforcement 68. The light rope 64 is illuminated when the light rope 64 is turned on to visually alert motorists 70 on the roadway 30 to the hazard 66 on the roadway 30 thereby facilitating the motorists 70 to avoid the hazard 66.

The light rope 64 has a first end 72 and a second end 74; the first end 72 is attached to an outside surface 73 of the spool 46 and the second end 74 is exposed with respect to the chute 14. The light rope 64 is comprised of a translucent material to emit light outwardly through the light rope 64. Furthermore, the light rope 64 may have a length ranging between approximately 12.0 meters and 18.0 meters thereby facilitating the light rope 64 to be extended fully across the roadway 30. A plurality of light emitters 76 is provided and each of the plurality of light emitters 76 is positioned within the light rope 64 to emit light outwardly through the light rope 64. The plurality of light emitters 76 is spaced apart from each other and is distributed between the first end 72 and the second end 74 of the light rope 64. Additionally, each of the plurality of light emitters 76 may comprise a light emitting diode or other type of electronic light emitter that can emit light in a variety of colors.

A clasp 78 is attached to the light rope 64 and the clasp 78 is attachable to a support object 80 when the light rope 64 is pulled outwardly from the drum 12 for retaining the light rope 64 in a desired position on the roadway 30. The clasp 78 includes a first jaw 82 that is pivotally attached to a second jaw 84. The first jaw 82 and the second jaw 84 are biased together and the first jaw 82 and the second jaw 84 are urgeable apart from each other. The clasp 78 includes a coupler 86 that is attached to a pivot point 88 between the first jaw 82 and the second jaw 84 and the coupler 86 is attached to the second end 74 of the light rope 64.

A control panel 90 is attached to the drum 12 and the control panel 90 is in communication with the light rope 64 for turns the light rope 64 on and off. The control panel 90 is positioned on the second lateral wall 18 of the drum 12. The control panel 90 comprises a control circuit 92 that is integrated into the control panel 90. The control circuit 92 includes an electronic memory 94 that stores an operational program and the control circuit 92 is electrically coupled to each of the plurality of light emitters 76. The electronic memory 94 may comprise a non volatile flash memory or other similar type of digital data storage.

The control panel 90 includes a touch screen 96 that is integrated into the control panel 90 thereby facilitating the touch screen 96 to be touched. The touch screen 96 is electrically coupled to the control circuit 92 and the touch screen 96 displays indicia 98 comprising icons for selecting operational parameters of the operational program. The operational parameters include a sequence of blinking of the plurality of light emitters 76 and a selection of various colors of light. The sequence of blinking includes a first direction which involves the plurality of light emitters 76 being sequentially illuminated from the first end 72 of the light rope 64 toward the second end 74 of the light rope 64. The sequence of blinking includes a second direction which involves the plurality of light emitters 76 being sequentially illuminated from the second end 74 of the light rope 64 toward the first end 72 of the light rope 64. The touch screen 96 may comprise a liquid crystal display that is touch sensitive or other type of electronic display.

The control panel 90 includes a power switch 100 that is slidably integrated into the control panel 90 and the power switch 100 is electrically coupled to the control circuit 92. The power switch 100 is positionable in an on position for actuating the plurality of light emitters 76. Furthermore, the power switch 100 is positionable in an off position for de-actuating the plurality of light emitters 76. The control panel 90 includes a power supply 102 that is integrated into the control panel 90 and the power supply 102 is electrically coupled to the control circuit 92.

The power supply 102 comprises a rechargeable battery 104 that is removably positioned in the control panel 90 and the rechargeable battery 104 is electrically coupled to the control circuit 92. The power supply 102 includes a charge port 106 that is recessed into the control panel 90 thereby facilitating the charge port 106 to insertably receive a charge cord 108. The charge port 106 is electrically coupled to the rechargeable battery 104 for charging the rechargeable battery 104. A battery cover 110 is removably attached to the control panel 90 and the rechargeable battery 104 is positioned behind the battery cover 110.

In use, the drum 12 is placed on the roadway 30 adjacent to a respective shoulder of the roadway 30 and a desired length of the light rope 64 is pulled outwardly from the chute 14. The light rope 64 is laid on the roadway 30 to define a line along which law enforcement 68 have chosen to direct traffic. The control panel 90 is manipulated to turn on the light emitters 76 and to select the color of light emitted by the light emitters 76 as well as to choose either the first direction or the second direction of the blinking sequence. In this way the light emitters 76 visually communicate to oncoming motorists 70 that there is a hazard 66 in the roadway 30 as well as to communicate which direction the oncoming motorists 70 should go around the hazard 66. Furthermore, the light rope 64 facilities emergency lighting to be rapidly established to protect individuals involved with the hazard 66 as well as to protect the oncoming motorists 70 from the hazard 66. The locking mechanism 52 is manipulated into the unlocking condition to facilitate the light rope 64 to be automatically retracted into the drum 12 when the hazard 66 has been cleared from the roadway 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency lighting assembly for directing motorists around a hazard on a roadway, said assembly comprising:
    a drum having a chute extending into an interior of said drum;
    a handle being pivotally attached to said drum thereby facilitating said handle to be gripped for carrying said drum;
    a spool being rotatably disposed within said drum, said spool being biased to rotate in a first direction, said spool being urgeable to rotate in a second direction;
    a locking mechanism being movably integrated into said drum, said locking mechanism releasably engaging said spool, said locking mechanism being biased into a locking condition to inhibit, said spool from rotating, said locking mechanism urgeable into an unlocking condition to facilitate said spool to rotate;
    a light rope being attached to said spool, said light rope being wrapped around said spool when said spool rotates in said first direction such that said light rope is stored within said drum, said spool being urged to rotate in said second direction when said light rope is pulled outwardly through said chute thereby facilitating said light rope to be positioned on the roadway wherein said light rope is configured to be positioned in front of a hazard on the roadway, said light rope being illuminated when said light rope is turned on wherein said light rope is configured to visually alert motorists on the roadway to the hazard on the roadway thereby facilitating the motorists to avoid the hazard;
    a clasp being attached to said light rope, said clasp being attachable to a support object when said light rope is pulled outwardly from said drum for retaining said light rope in a desired position on the roadway;
    a control panel being attached to said drum, said control panel being in communication with said light rope for turning said light rope on and off, said control panel being positioned on said second lateral wall of said drum;
    wherein said drum has a first lateral wall, a second lateral wall and an outer wall extending between said first lateral wall and said second lateral wall, each of said first lateral wall and said second lateral wall having a perimeter edge being continuously arcuate about a center of said drum such that each of said first lateral wall and said second lateral wall has a circular shape;
    wherein said chute extends away from said outer wall, said chute having a distal end with respect to said outer wall and a lower surface, said distal end being open, said lower surface defining a base of said drum thereby facilitating said base to be positioned on a roadway having drum extending upwardly from the roadway;
    wherein said outer wall has a prominence extending away from said outer wall, said prominence being positioned on an opposite side of said outer wall with respect to said chute, said prominence having a top surface lying on a plane being oriented parallel with said lower surface of said chute;
    wherein said assembly includes an axle extending between said first lateral wall and said second lateral wall of said drum, said axle being centrally positioned in said drum;

wherein said spool is rotatably disposed on said axle, said spool includes a biasing member being coiled around said axle, said biasing member being attached to said axle and an interior surface of said spool, said biasing member biasing said spool to rotate in said first direction around said axle; and wherein said locking mechanism comprises
  a gear being rotatably disposed around said axle, said gear being attached to said spool, said gear having a plurality of teeth being distributed around an outer surface of said gear, each of said teeth having a first surface being perpendicularly oriented with said outer surface of said gear, each of said teeth having a second surface sloping between said first surface and said outer surface of said gear, and
  a peg extending through said first lateral wall of said drum, said peg having a knob being attached to said peg and being positioned outside of said drum thereby facilitating said peg to be gripped, said peg being aligned with said outer surface of said gear, said peg being biased to extend laterally across said outer surface of said gear.

2. The assembly according to claim 1, wherein said handle having a central member extending between a pair of outward members, a lower end of each of said outward members being pivotally attached to said top surface of said prominence thereby facilitating said central member to be gripped.

3. The assembly according to claim 1, wherein said second surface of each of said teeth slides along said peg when said spool is rotated in said second direction, said first surface of a respective one of said teeth abutting said peg when said spool is biased to rotate in said first direction thereby inhibiting said spool to rotate in said first direction, said peg being urgeable outwardly through said first lateral wall of said drum having said peg being displaced from said outer surface of said gear thereby facilitating said spool to rotate in said first direction.

4. The assembly according to claim 1, wherein:
  said light rope has a first end and a second end, said first end being attached to an outside surface of said spool, said second end being exposed with respect to said chute, said light rope being comprised of a translucent material wherein said light rope is configured to emit light outwardly through said light rope; and
  said assembly includes a plurality of light emitters, each of said plurality of light emitters being positioned within said light rope wherein each of said light emitters is configured to emit light outwardly through said light rope, said plurality of light emitters being spaced apart from each other and being distributed between said first end and said second end of said light rope.

5. The assembly according to claim 4, wherein said clasp includes a first jaw being pivotally attached to a second jaw, said first jaw and said second jaw being biased together, said first jaw and said second jaw being urgeable apart from each other, said clasp including a coupler being attached to a pivot point between said first jaw and said second jaw, said coupler being attached to said second end of said light rope.

6. The assembly according to claim 4, wherein said control panel comprises:
  a control circuit being integrated into said control panel, said control circuit including an electronic memory storing an operational program, said control circuit being electrically coupled to each of said plurality of light emitters; and a touch screen being integrated into said control panel thereby facilitating said touch screen to be touched, said touch screen being electrically coupled to said control circuit, said touch screen displaying indicia comprising icons for selecting operational parameters of said operational program, said operational parameters including a sequence of blinking of said plurality of light emitters, said sequence of blinking including a first direction having said plurality of light emitters being sequentially illuminated from said first end of said light rope toward said second end of said light rope, said sequence of blinking including a second direction having said plurality of light emitters being sequentially illuminated from said second end of said light rope toward said first end of said light rope.

7. The assembly according to claim 6, wherein said control panel includes:
  a power switch being slidably integrated into said control panel, said power switch being electrically coupled to said control circuit, said power switch being positionable in an on position for actuating said plurality of light emitters, said power switch being positionable in an off position for de-actuating said plurality of light emitters; and
  a power supply being integrated into said control panel, said power supply being electrically coupled to said control circuit, said power supply comprising:
    a rechargeable battery being removably positioned in said control panel, said rechargeable battery being electrically coupled to said control circuit; and
    a charge port being recessed into said control panel thereby facilitating said charge port to insertably receive a charge cord, said charge port being electrically coupled to said rechargeable battery for charging said rechargeable battery.

8. An emergency lighting assembly for directing motorists around a hazard on a roadway, said assembly comprising:
  a drum having a chute extending into an interior of said drum, said drum having a first lateral wall, a second lateral wall and an outer wall extending between said first lateral wall and said second lateral wall, each of said first lateral wall and said second lateral wall having a perimeter edge being continuously arcuate about a center of said drum such that each of said first lateral wall and said second lateral wall has a circular shape, said chute extending away from said outer wall, said chute having a distal end with respect to said outer wall and a lower surface, said distal end being open, said lower surface defining a base of said drum thereby facilitating said base to be positioned on a roadway having drum extending upwardly from the roadway, said outer wall having a prominence extending away from said outer wall, said prominence being positioned on an opposite side of said outer wall with respect to said chute, said prominence having a top surface lying on a plane being oriented parallel with said lower surface of said chute;
  a handle being pivotally attached to said drum thereby facilitating said handle to be gripped for carrying said drum, said handle having a central member extending between a pair of outward members, a lower end of each of said outward members being pivotally attached to said top surface of said prominence thereby facilitating said central member to be gripped;
  an axle extending between said first lateral wall and said second lateral wall of said drum, said axle being centrally positioned in said drum;

a spool being rotatably disposed within said drum, said spool being biased to rotate in a first direction, said spool being urgeable to rotate in a second direction, said spool being rotatably disposed on said axle, said spool including a biasing member being coiled around said axle, said biasing member being attached to said axle and an interior surface of said spool, said biasing member biasing said spool to rotate in said first direction around said axle;

a locking mechanism being movably integrated into said drum, said locking mechanism releasably engaging said spool, said locking mechanism being biased into a locking condition to inhibit said spool from rotating, said locking mechanism urgeable into an unlocking condition to facilitate said spool to rotate, said locking mechanism comprising:

a gear being rotatably disposed around said axle, said gear being attached to said spool, said gear having a plurality of teeth being distributed around an outer surface of said gear, each of said teeth having a first surface being perpendicularly oriented with said outer surface of said gear, each of said teeth having a second surface sloping between said first surface and said outer surface of said gear; and a peg extending through said first lateral wall of said drum, said peg having a knob being attached to said peg and being positioned outside of said drum thereby facilitating said peg to be gripped, said peg being aligned with said outer surface of said gear, said peg being biased to extend laterally across said outer surface of said gear, said second surface of each of said teeth sliding along said peg when said spool is rotated in said second direction, said first surface of a respective one of said teeth abutting said peg when said spool is biased to rotate in said first direction thereby inhibiting said spool to rotate in said first direction, said peg being urgeable outwardly through said first lateral wall of said drum having said peg being displaced from said outer surface of said gear thereby facilitating said spool to rotate in said first direction;

a light rope being attached to said spool, said light rope being wrapped around said spool when said spool rotates in said first direction such that said tight rope is stored within said drum, said spool being urged to rotate in said second direction when said tight rope is pulled outwardly through said chute thereby facilitating said light rope to be positioned on the roadway wherein said light rope is configured to be positioned in front of a hazard on the roadway, said light rope being illuminated when said light rope is turned on wherein said light rope is configured to visually alert motorists on the roadway to the hazard on the roadway thereby facilitating the motorists to avoid the hazard, said light rope having a first end and a second end, said first end being attached to an outside surface of said spool, said second end being exposed with respect to said chute, said light rope being comprised of a translucent material wherein said light rope is configured to emit light outwardly through said light rope;

a plurality of light emitters, each of said plurality of light emitters being positioned within said light rope wherein each of said light emitters is configured to emit light outwardly through said light rope, said plurality of light emitters being spaced apart from each other and being distributed between said first end and said second end of said light rope;

a clasp being attached to said light rope, said clasp being attachable to a support object when said light rope is pulled outwardly from said drum for retaining said light rope in a desired position on the roadway, said clasp including a first jaw being pivotally attached to a second jaw, said first jaw and said second jaw being biased together, said first jaw and said second jaw being urgeable apart from each other, said clasp including a coupler being attached to a pivot point between said first jaw and said second jaw, said coupler being attached to said second end of said light rope; and a control panel being attached to said drum, said control panel being in communication with said light rope for turning said light rope on and off, said control panel being positioned on said second lateral wall of said drum, said control panel comprising:

a control circuit being integrated into said control panel, said control circuit including an electronic memory storing an operational program, said control circuit being electrically coupled to each of said plurality of light emitters;

a touch screen being integrated into said control panel thereby facilitating said touch screen to be touched, said touch screen being electrically coupled to said control circuit, said touch screen displaying indicia comprising icons for selecting operational parameters of said operational program, said operational parameters including a sequence of blinking of said plurality of light emitters, said sequence of blinking including a first direction having said plurality of light emitters being sequentially illuminated from said first end of said light rope toward said second end of said light rope, said sequence of blinking including a second direction having said plurality of light emitters being sequentially illuminated from said second end of said light rope toward said first end of said light rope;

a power switch being slidably integrated into said control panel, said power switch being electrically coupled to said control circuit, said power switch being positionable in an on position for actuating said plurality of light emitters, said power switch being positionable in an off position for de-actuating said plurality of light emitters; and a power supply being integrated into said control panel, said power supply being electrically coupled to said control circuit, said power supply comprising:

a rechargeable battery being removably positioned in said control panel, said rechargeable battery being electrically coupled to said control circuit; and a charge port being recessed into said control panel thereby facilitating said charge port to insertably receive a charge cord, said charge port being electrically coupled to said rechargeable battery for charging said rechargeable battery.

* * * * *